(12) United States Patent
Fondriest (10) Patent No.: US 7,135,790 B2
(45) Date of Patent: Nov. 14, 2006

(54) MODULAR ELECTRICAL HARNESS FOR JET AIRCRAFT LANDING GEAR SYSTEMS

(76) Inventor: William Fondriest, 1270 Biscayne Blvd., #4, Deland, FL (US) 32724

( * ) Notice: Subject to any disclaimer, the term of this patent is extended or adjusted under 35 U.S.C. 154(b) by 286 days.

(21) Appl. No.: 10/693,801

(22) Filed: Oct. 24, 2003

(65) Prior Publication Data

US 2005/0088045 A1    Apr. 28, 2005

(51) Int. Cl.
*H01B 7/30* (2006.01)
(52) U.S. Cl. .................................... 307/147
(58) Field of Classification Search ................. 307/147
See application file for complete search history.

(56) References Cited

U.S. PATENT DOCUMENTS

| | | | |
|---|---|---|---|
| 5,388,790 A * | 2/1995 | Guthke et al. ................. | 248/58 |
| 5,829,129 A | 11/1998 | Ito | |
| 5,831,198 A | 11/1998 | Turley | |
| 5,869,907 A | 2/1999 | Marler | |
| 6,291,770 B1 | 9/2001 | Casperson | |
| 6,293,141 B1 * | 9/2001 | Nance ....................... | 73/178 T |
| 6,309,721 B1 * | 10/2001 | Gladfelter et al. ......... | 428/36.1 |
| 6,504,730 B1 | 1/2003 | Cooney | |
| 6,577,025 B1 | 6/2003 | Hentschel | |
| 6,827,594 B1 * | 12/2004 | Davis et al. ................. | 439/157 |
| 2003/0016520 A1 | 1/2003 | Cooney | |

* cited by examiner

*Primary Examiner*—Robert L. DeBeradinis
(74) *Attorney, Agent, or Firm*—Mark D. Bowen, Esq.; Stearns Weaver Miller Weissler Alhadeff & Sitterson, P.A.

(57) ABSTRACT

An improved modular landing gear harness for use on a jet aircraft is disclosed. The modular landing gear harness is divided into four sub-assemblies including the main sub-assembly, the brake temperature monitoring sub-assembly, the weight off wheels sub-assembly, and the anti-skid sub-assembly. The various sub-assemblies may be connected to form a unitary harness that provides a protective conduit for wiring for critical landing gear systems. The use of lightweight composite connectors facilitates troubleshooting and substantially reduces the overall weight of the harness assembly.

9 Claims, 9 Drawing Sheets

IDENTIFICATION LABELS

FIG. 13

MODULAR ELECTRICAL HARNESS FOR JET AIRCRAFT LANDING GEAR SYSTEMS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to electrical systems for jet aircraft, and more particularly to a modular electrical harness assembly for use on the main landing gear of a jet aircraft.

2. Description of the Background Art

The aviation industry is generally divided into two major providers, major air carriers and regional air carriers. The major carriers are those who operate larger jet aircraft that are capable of transporting passengers over greater distances. These aircraft are routinely used both in intercontinental and trans-oceanic operations. The second provider, the regional carrier, provides point to point service on shorter routes and feeder service to their major air carrier partners according to the hub and spoke method. This service is accomplished through the use of smaller turbo propeller and fan jet aircraft, normally ranging in size between 45 and 90 passengers.

With the increased demand on air carriers to provide more point to point and better on time service, the regional carriers have flourished through partnerships with major air carriers. Major carriers usually sign long term contracts with regional partners on a fee per departure basis which guarantees the regional operator a fixed price every time the aircraft leaves the gate, whether it is full of passengers or not.

The major carriers typically handle all of the reservation services and advertising, with the regional carriers aircraft painted to look like those of their major carrier partners. The only responsibility the regional carrier has is to make sure that the aircraft leaves the gate on time. For this their cost for operating the aircraft are covered and they are given an agreed upon profit margin. The major carrier is responsible for filling the seats. Accordingly, it has become ever more important to make sure that the aircraft operated by the regional carrier is able to depart on time when scheduled in an airworthy manner, because when it is unable to perform, the regional carrier looses money.

One of the major problems causing certain regional jet operators to miss and/or cancel flights was electrical failures in the landing gear anti-skid system. The landing gear anti-skid system includes an electrical harness which is mounted on the main landing gear of the aircraft. There are four harnesses of this type per aircraft and they monitor and control the anti-skid system along with the brake temperature monitoring system and the weight off wheels system.

Electrical harnesses send signals about different aircraft functions and parameters to the aircraft flight control deck for monitoring by computers and the aircrafts crew. A failure in the harness sends false signals which can cause erroneous readings and interpretations. These false readings and interpretations can cause flights to be cancelled and lengthy troubleshooting efforts to identify and repair the problem.

Extensive research found that a landing gear anti-skid harness had several flaws that contributed to the failures and/or to the lengthy troubleshooting and repair efforts. The first problem with a harness was that it had no feature to prevent the contamination of a harness by dirt and/or liquids. The second, and more important problem, was that when troubleshooting a harness, because of its design nature, it was impossible to remove and replace a single portion of a harness, without disrupting the entire harness. This usually meant that the aircraft would have to be removed from the gate and returned to the hangar for extensive troubleshooting and maintenance. Flights were cancelled and revenue was lost when this problem occurred.

Once back at the hangar, the work of troubleshooting and repairing a harness had just begun. Once the problem with a harness was found, which usually was attributed to a failure of the anti-skid portion due to moisture ingress, the entire harness would have to be replaced. This procedure called for the complete aircraft to be lifted into the air via jacks and then the harness in question to be removed in its entirety. This process would normally take a skilled crew between four and six hours to accomplish.

Once a harness had been removed a complete new harness would have to be reinstalled and the landing gear would have to be retracted and extended several times along with other functional tests in order to calibrate the new harness and confirm all systems were operational. Since the complete harness assembly would have to be removed and replaced, additional harness assemblies would have to be maintained in stock, at different locations, which would add additional inventory and cost burden to the carrier.

In total, an aircraft needing to have one harness replaced in this manner would usually be removed from service and at the hangar for at least eight to ten hours. This would mean that its total usage for that day would have to be cancelled and if another aircraft was not put into service to cover its original flight cancellation, then additional flights within the system would be adversely effected. This would cause loss revenue and customer dissatisfaction which could have catastrophic consequences in the long term.

In addition, is has been found that certain portions of prior art harnesses were burdened with significant limitations. More particularly, it has been found that prior art harnesses, and particularly the upper main sub-assembly failed after, and mostly as a result of, repeated retraction and extension of the landing gear. Failure of the main sub-assembly may result in exposure and/or damage of the internal wires.

Accordingly, there is a need for a harness that is more reliable and user friendly. This harness should incorporate the latest technologies in corrosion and contamination prevention. In addition, a harness should be designed to be modular in nature, allowing the troubleshooting and replacement of only those sub-assemblies that had failed without the disruption of the rest of the systems and cancellation of flights. Since a harness of this kind would be modular in nature, then only those sub-assemblies would need to be maintained in inventory, vastly reducing the cost associated with operating this harness.

SUMMARY OF THE INVENTION

The present invention is directed to a modular landing gear harness to be used on a regional jet aircraft. The harness is designed to allow the aircraft technicians the ability to troubleshoot and replace certain sections of a harness quicker and easier than previously allowed. More specifically, the present invention not only makes a harness a more reliable product through its inherent design, but also allows an aircraft technician the ability to remove and replace a specific portion of a harness without disrupting the other systems associated with a harness. The quick nature in which a harness can be diagnosed and a specific section can be replaces allows for quicker turn around of aircraft and less cancellations.

To achieve these advantages and in accordance with the purpose of the invention, as embodied and broadly described, the invention comprises a harness, that is modular in nature and employs the latest technologies in corrosion and contamination resistance. The harness is divided into four sub-assemblies that when combined together make up a complete harness assembly. The four sub-assemblies are the main sub-assembly, the brake temperature monitoring (BTM) sub-assembly, the weight off wheels (WOW) sub-assembly, and the anti-skid (AS) sub-Assembly.

Additional features and advantages of the invention will be set forth in the description which follows and in part will be apparent from the description or may be learned by practice of the invention. The objectives and other advantages of the invention will be realized and attained by the apparatus particularly pointed out in the written description and claims hereof as well as the appended drawings.

It is to be understood that the foregoing general description and the following detailed descriptions are exemplary and explanatory and are intended to provide further explanation of the invention as claimed.

BRIEF DESCRIPTION OF THE SEVERAL VIEWS OF THE DRAWINGS

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE INVENTION

Figure 1:
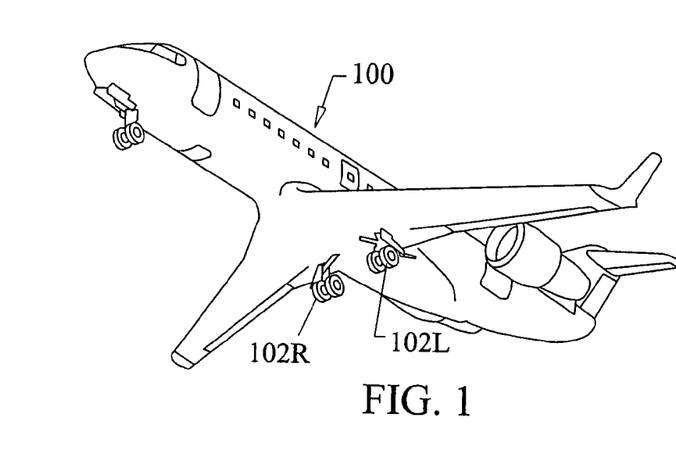
FIG. 1 depicts a jet aircraft with landing gear down to illustrate the environment for the present application.
Figure 2:
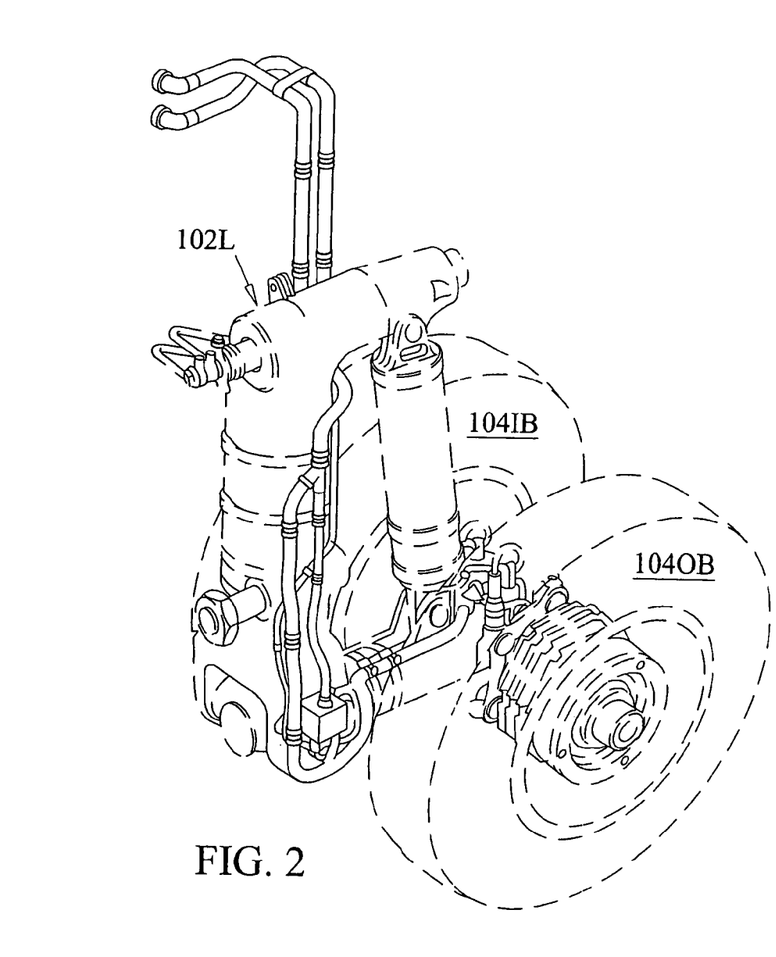
FIG. 2 is a detailed perspective view of the left landing gear in a partially deployed configuration.
Figure 3:
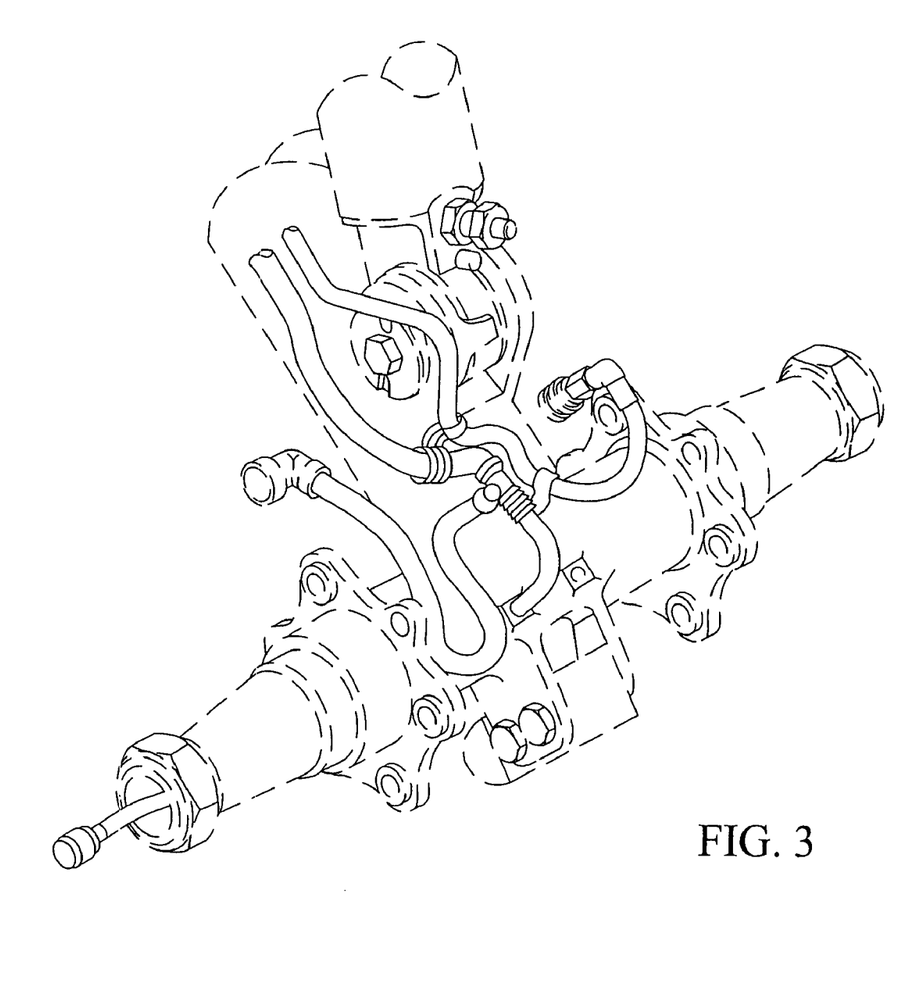
FIG. 3 is a partial detailed view of the axel thereof with wheels removed.
Figure 4:
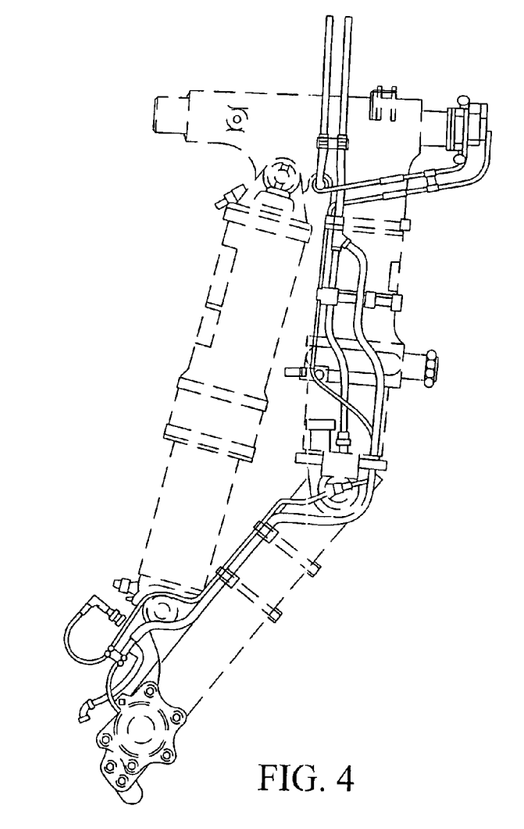
FIGS. 4 and 5 depict inboard side views of the left and right landing gear in the fully deployed configuration.
Figure 5:
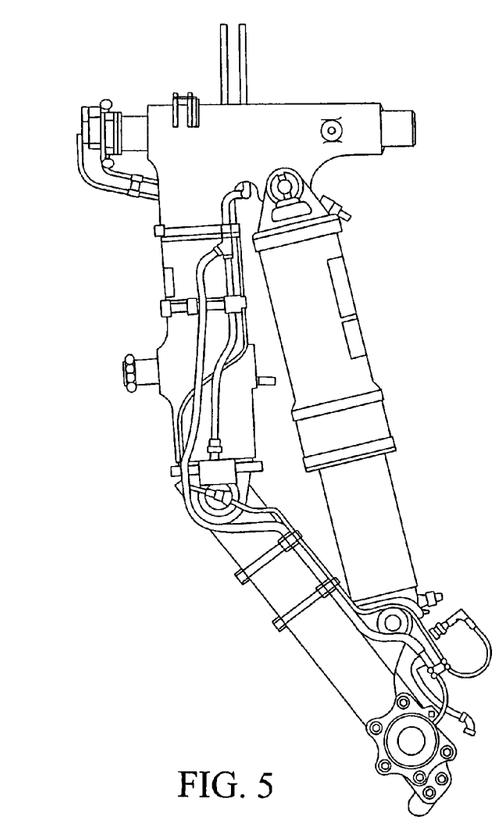

With reference now to the drawings, as best the present invention provides an electrical wiring harness specifically designed for use on the main landing gear of a jet aircraft as best illustrated in FIGS. 1–5. More particularly, a modern jet aircraft, such as the CANADAIR Regional Jet referenced as 100, includes left and right main landing gear systems, referenced as 102-L and 102-R respectively. FIG. 2 is a partial view of the left main landing gear 102L and depicts the landing gear in a partially deployed configuration. FIG. 3 is a partial detailed view of the lower portion of the main landing gear with the wheels removed. FIGS. 4 and 5 depict inboard side views of the left and right main landing gear in fully deployed (e.g. down) configuration with the wheels removed.

Each left and right main landing gear system, 102-L and 102-R, have inboard and outboard wheels, referenced as 104-IB and 104-OB respectively. Each of the wheels includes a brake temperature sensing system ("BTS"), a weight-off-wheels sensing system ("WOW"), and an anti-skid system. Accordingly, each main landing gear requires two electrical harnesses such as the prior art harnesses depicted in FIGS. 1–5. More particularly, the prior art harnesses include an inboard harness 106-IB and an outboard harness 106-OB, for routing electrical wiring from sensors and other electrical components associated with the inboard and outboard landing gear systems to monitoring and control systems located onboard the aircraft. The prior art inboard and outboard harnesses comprise unitary structures that run from the aircraft's landing gear wheel well down the landing gear structure to the inboard and outboard wheels. As noted hereinabove, a failure associated with any one part of the prior art harnesses requires replacement of the entire harness thus grounding the aircraft for many hours while the defective harness is replaced.

With reference now to FIGS. 6–13 there is depicted a modular main landing gear electrical wiring harness 10 for use on the landing gear of a jet aircraft according to a preferred embodiment of the present invention. As more fully disclosed herein, modular main landing gear wiring harness 10 incorporates advanced structural and functional features for preventing moisture intrusion and for preventing corrosion. Harness 10 is particularly designed to allow operators easier troubleshooting and replacement of various harness systems. Landing gear harness 10 includes a main harness sub-assembly 20, a brake temperature monitoring sub-assembly 30, a weight-off-wheels sub-assembly 40, and an anti-skid sub-assembly 50.

Figure 6:
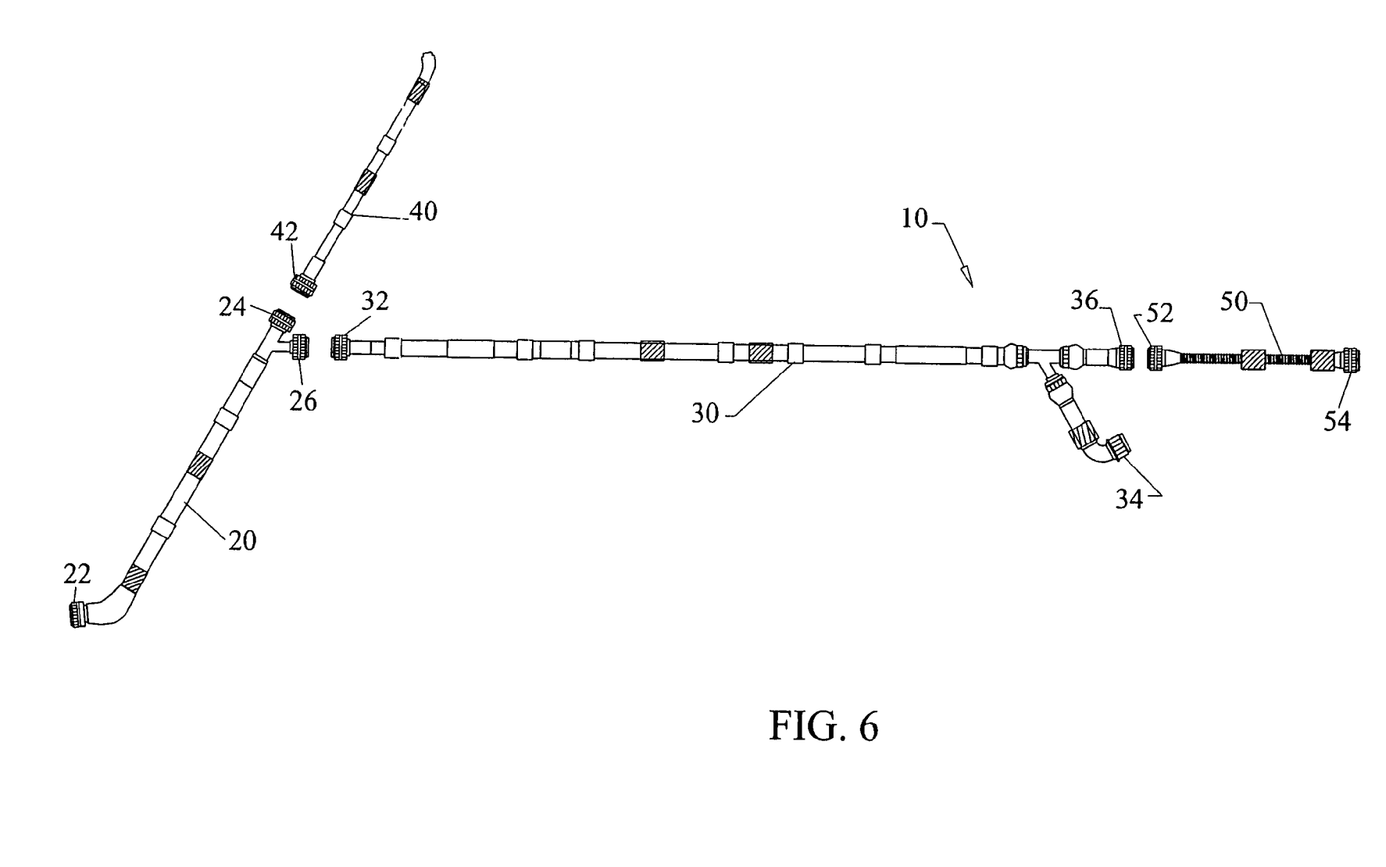
FIG. 6 is an exploded view of a complete harness assembly in accordance with the present invention.
Figure 7A:
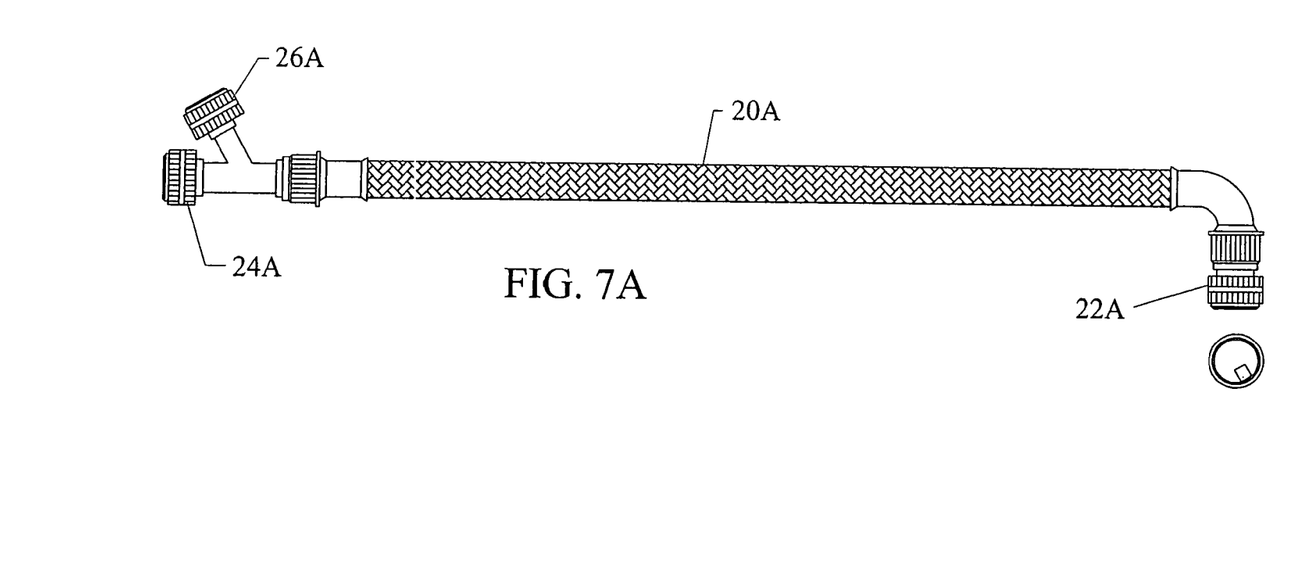
FIGS. 7A and 7B depict the main sub-assembly harness for outboard and inboard installations respectively.
Figure 7B:
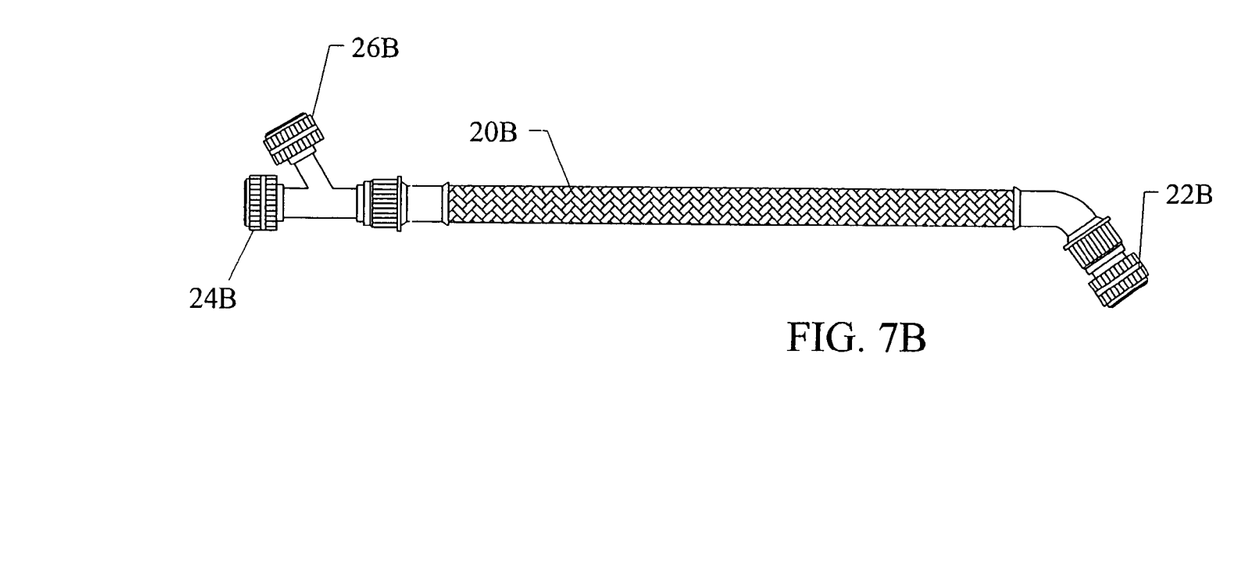

As depicted in FIGS. 6, 7A, and 7B, main sub-assembly 20 is the main connection point between the airframe of the aircraft and the remaining sub-assemblies that traverse downward along the main landing gear. Main sub-assembly 20 has a large mil-spec connector 22 at a proximal end thereof, and two smaller mil-spec connectors 24 and 26 forming a Y-junction at a distal end thereof. Main sub-assembly 20 provides a conduit that houses all of the relevant wires for the weight-off-wheels, brake temperature monitoring system and anti-skid system sub-assemblies.

Large mil-spec connector 22 mates with a corresponding mil-spec connector (not shown) positioned in the airframe of the aircraft. The two smaller mil-spec connectors 24 and 26 mate with corresponding mil-spec connectors. More particularly, mil-spec connector 24 is attached to a corresponding mil-spec connector 42 on the weight-off-wheels sub-assembly 40, and mil-spec connector 26 is attached to a corresponding mil-spec connector 32 on the brake temperature monitoring system sub-assembly 30.

Figure 9:
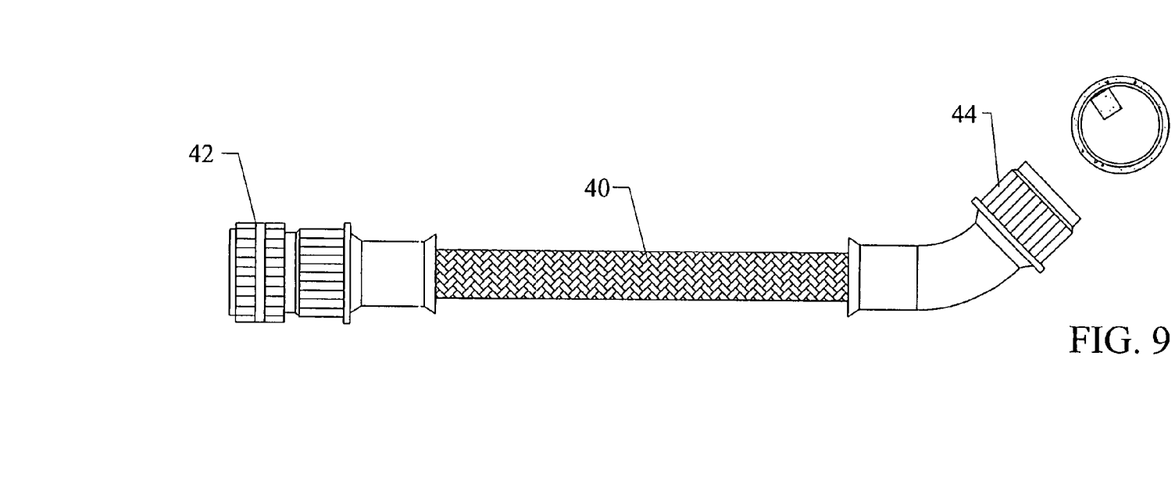
FIG. 9 depicts the weight-off-wheels (WOW) sub-assembly harness.

As best depicted in FIG. 9, the weight-off-wheels ("WOW") sub-assembly 40 includes connector 42 at a proximal end thereof that is normally connected to mil-spec connector 24 on main sub-assembly 20, and a proximity sensor 44 at a distal end thereof. Proximity sensor 44 functions in accordance with the Hall Principle and is capable of generating a "signal near", "signal neutral" and "signal far" indication. Each signal is sent via the harness back to a control box (not shown) located in the avionics bay of the aircraft. This information is filtered and then sent to the flight control deck where it relays pertinent information to the pilot. The sensor is mounted directly to the main landing gear in a method as to indicate the position of the landing gear relative to the ground. The signal near is generated when the target is in direct view of the sensor indicating the full weight of the aircraft is on the landing gear, because the aircraft is on the ground. The signal neutral, which indicates a target in transit, is generated when the landing gear is transitioning from the full weight on wheels position to full weight off wheels as the aircraft became airborne. The signal far, which indicates that the original target transitioned through the full range of motion and at the end of its travel, indicates that the full weight of the aircraft is off of the wheels.

Figure 8:
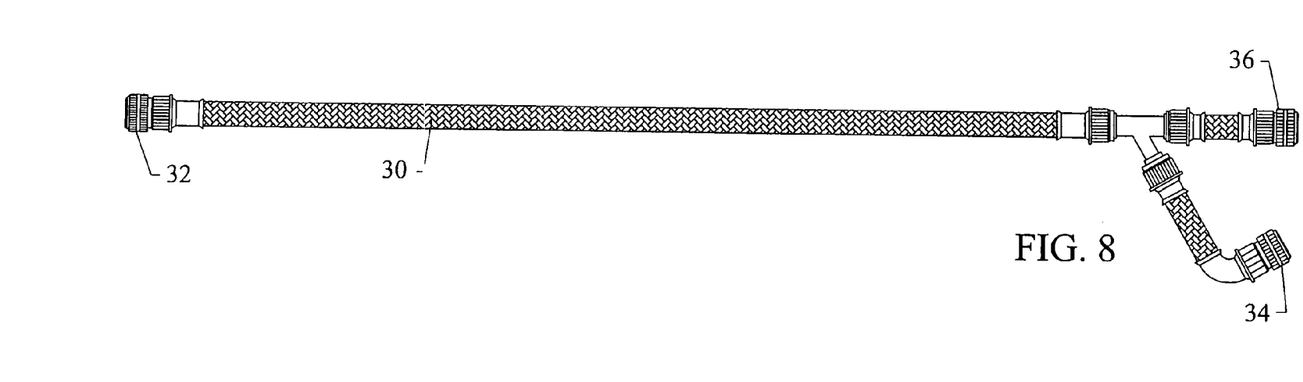
FIG. 8 depicts the brake temperature monitoring sub-assembly (BTMS) harness.

As best depicted in FIGS. 6 and 8, the brake temperature monitoring System ("BTMS") sub-assembly 30 is a harness that has a first mil-spec connector 32 at a proximal end thereof end coupled to the corresponding mil-spec connector 26 on the main harness sub-assembly 20. At the distal end of the BTMS sub-assembly 30 is a first mil-spec connector 34 that attaches to a thermal couple (not shown) installed on the main wheel brake assembly, and a second mil-spec connector 36 that attaches to the anti-skid sub-assembly 50. The harness has wires for both the anti-skid sub-assembly and the BTMS sub-assembly. The BTMS sub-assembly includes pre-calibrated chromel and alumel wires that translate heat readings from a thermal couple installed in the main wheel brake assembly up through the harness sub-assembly to the Main Harness sub-assembly, and eventually to a control box in the avionics bay that filters the information and provides a warning to the flight control deck should the temperature of the main wheel brake assembly exceed its operating limitations. This warning allows the crew time to release the brakes and allow them to cool prior to blowing out either the tires and/or fusible plugs located in the wheel rims. Mil-spec connector 36 is connected to a corresponding mil-spec connector 52 on the anti-skid sub-assembly 50.

Figure 10:
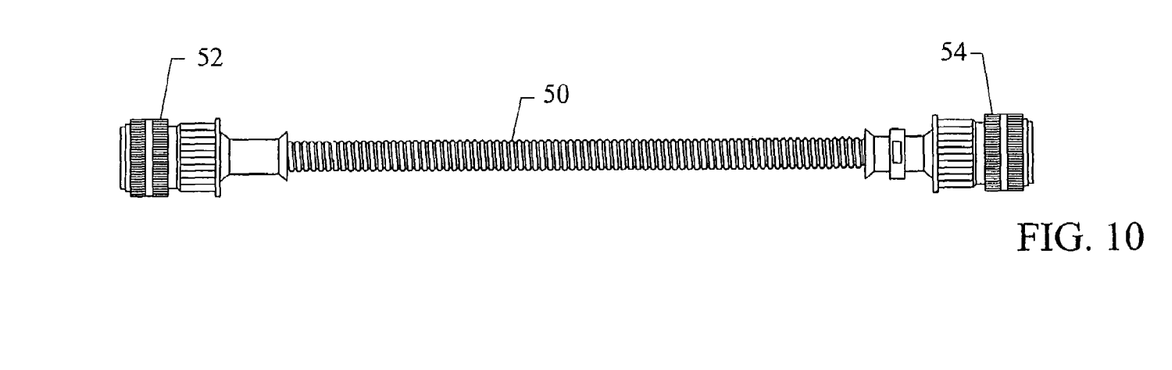
FIG. 10 depicts the anti-skid sub-assembly harness.
Figure 11:
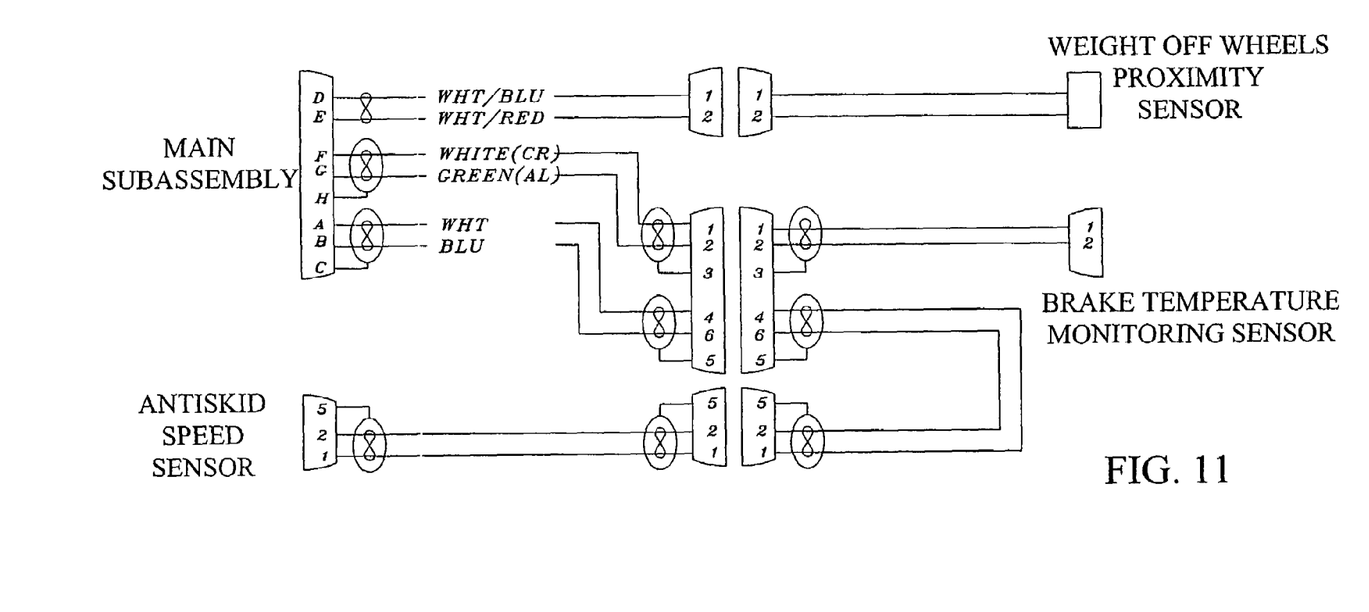
FIG. 11 is a wiring schematic for a harness assembly according to the present invention.

As best depicted in FIGS. 6 and 10, the anti-skid sub-assembly 50 is a small harness comprised of tubing with a first mil-spec connector 52 connected to a corresponding mil-spec connector 36 on the BTMS sub-assembly 30. Anti-skid sub-assembly 50 is routed through a neoprene grommet (not shown) inserted into the main gear wheel axle assembly and transitioned through the interior of the axle to the wheel speed sensor that is located at the end of the axle assembly. The wheel speed sensor is maintained in a stationary position inside the inner dimension of the axle and has a rotating boss at one end and a mil-spec connector at the other. That mil-spec connector (not shown) attaches to the corresponding mil-spec connector 54 on the anti-skid sub-assembly 50 and the rotating boss fits into a corresponding recess on the back side of the main wheels hub cap assembly. As the main wheel spins, the hubcap also spins which in turn spins the wheel speed sensor. Signals from the sensor are transmitted up through the anti-skid sub-assembly 50 through BTMS sub-assembly 30 onto main harness sub-assembly 20. From there these signals are again transmitted to a control box located in the avionics bay of the aircraft were the signal is filtered and interpreted. Unlike previous signals, software in the control box will control, through electronic pulses, hydraulic fluid that will engage and disengage in rapid succession the main wheel brakes in an effort to prevent them from locking the wheels and causing damage to the tires and/or to the airframe.

The landing gear harness assembly of the present invention is preferably configured for both an inboard configuration and an outboard configuration, wherein the only difference is that the main sub-assembly 20 has a longer overall dimension in the outboard configuration than the main sub-assembly 20 used in the inboard configuration. The additional length of main sub-assembly 20 in the outboard configuration enables the harness to be routed over the landing gear structural members to an outboard position. Conversely the main sub-assembly for an inboard configuration is shorter than its outboard counterpart. The dimensional difference allows the harnesses to accommodate the landing gear movement as the gear retracts toward the centerline of the aircraft. Therefore, the inboard harness must traverse a smaller radius than the outboard harness.

As should now be apparent, a significant aspect of the present invention relates to the modular aspect of the harness. By providing a modular harness troubleshooting is simplified, and individual harness sub-assemblies may be easily removed and replaced without requiring that the aircraft be taken out of service to replace the entire harness assembly as is required with non-modular harnesses of the prior art. More particularly, the harness of the present invention has received FAA certification to allow for interchangeability of the three main sub-assemblies, namely the WOW, BTMS, and AS sub-assemblies, between all four positions, e.g. left landing gear inboard and outboard, and right landing gear inboard and outboard. Accordingly, the modular harness sub-assemblies are capable of being used as replacement parts for both the left hand and right hand— inboard and outboard positions on the landing gear. As a result of the interchangeability of the sub-assemblies the landing gear harness spare parts inventory required to service a particular jet aircraft is reduced by approximately 60% over inventory requirements for prior art harnesses.

An additional significant aspect of the present invention relates to the use of composite connectors that meet the requirements of Mil-C-38999. The composite connectors have added strength, reduce overall weight and increase corrosion resistance. More particularly, the connectors use gold plated pins and sockets which increase conductivity as well as corrosion resistance. In addition, the wire used in the harness assembly is silver coated copper, instead of the tin coated wires used in the prior art harnesses. Furthermore, the harness incorporates sealing thermal fit tubing with an adhesive lining to seal all openings in the joints at various transition areas of the harness. By covering various transition areas of the harness, not only are these areas protected against moisture contamination, but also added strain relief is provided to help against damage from servicing and vibration.

Figure 12:
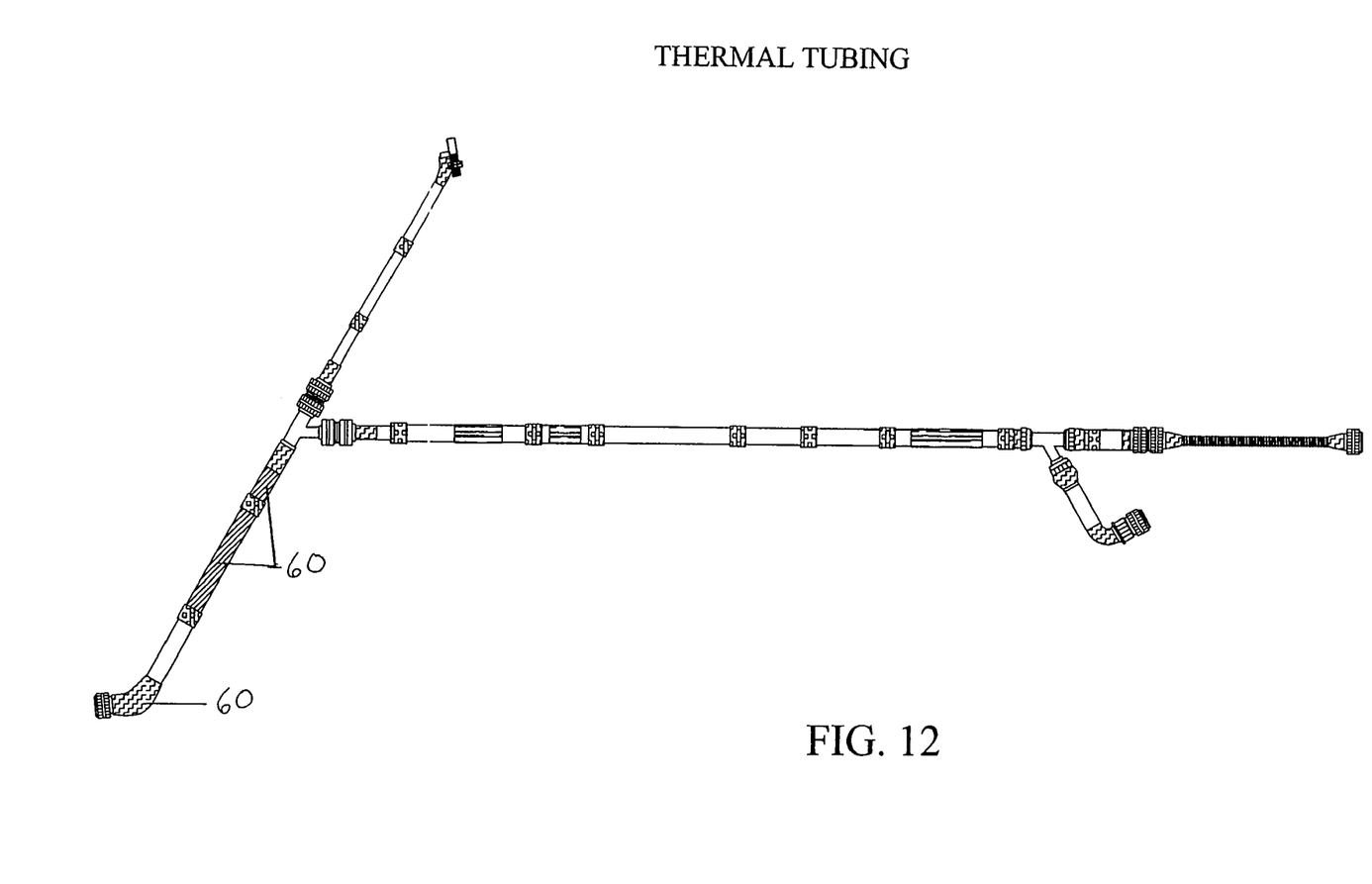
FIG. 12 illustrates the location of protective thermal tubing on a harness according to the present invention.

As best illustrated in FIG. 12, a further significant aspect of the present invention relates to the incorporation of abrasion resistant thermal tubing on portions of harness 10. More particularly, harness 10 includes abrasion resistant sleeves, referenced as 60 for shielding the underlying tubular harness structure from abrasion. The ability to shield portions of the harness from abrasion is considered particularly important since the present inventor has discovered that repeated extension and retraction of the landing gear causes the wiring harness to rub against portions of the landing gear structure thereby leading to failure.

Figure 13:
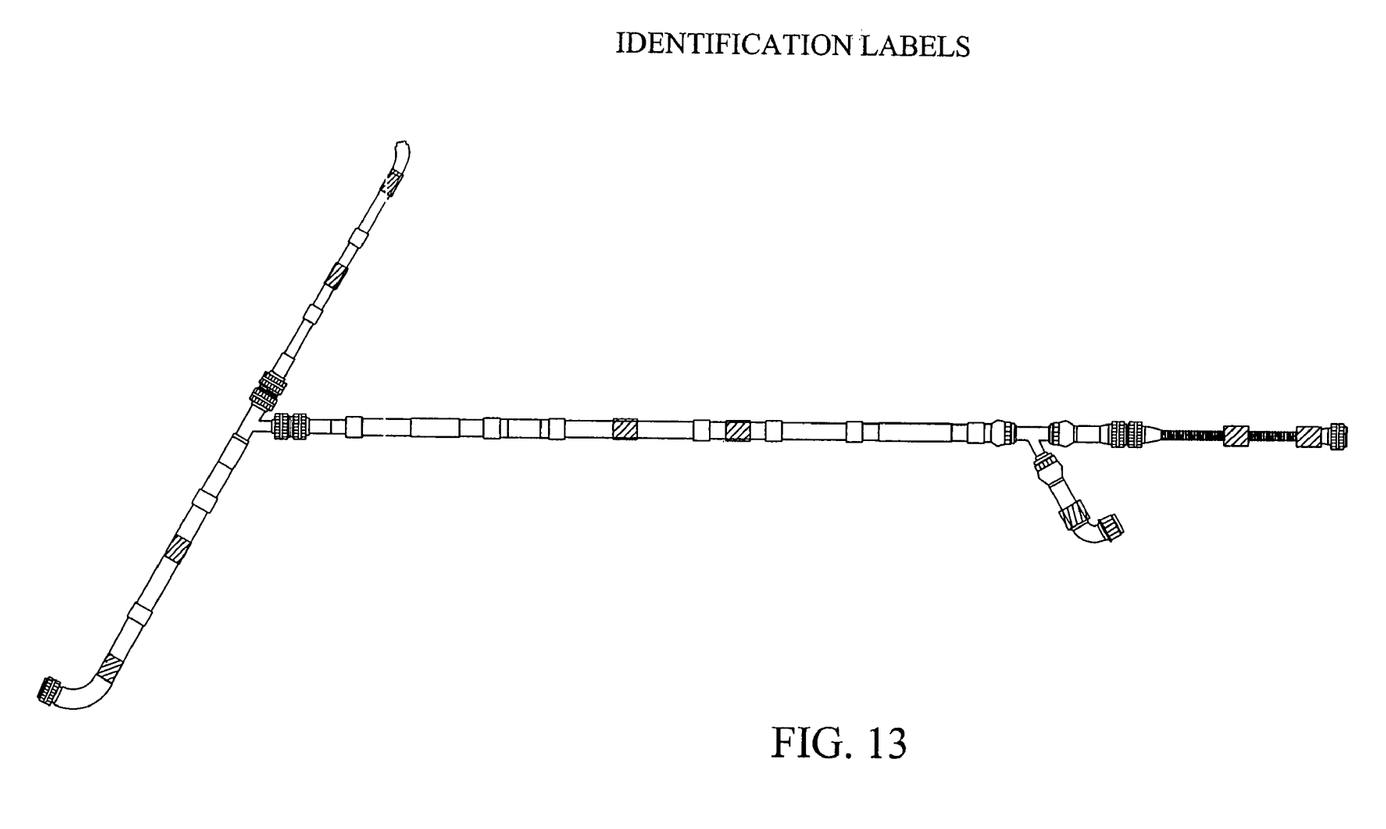
FIG. 13 illustrates the location of part marking labels for a harness according to the present invention.

As best illustrated in FIG. 13, the landing gear wiring harness of the present invention is further adapted to include part number identification labels such that each sub-assembly is easily identifiable. Labeling each sub-assembly with an identification label is considered particularly important given the modular nature of the wiring harness of the present invention as each of the above-referenced sub-assemblies may be disconnected and removed from the aircraft.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A modular landing gear wiring system for a jet aircraft, said wiring system comprising:
   a generally tubular wiring harness providing a conduit for electrical wiring, said wiring harness having connectable first, second, third, and fourth sub-assemblies;
   said first sub-assembly adapted for electrical connection to aircraft electrical systems;
   said second sub-assembly having a first end connectable to said first sub-assembly and a second end connectable to a weight-off-wheels sensing apparatus;
   said third sub-assembly having a first end connectable to said first sub-assembly, a second end adapted for connection to a brake temperature monitoring apparatus; and
   said fourth sub-assembly having a first end connectable to said third sub-assembly and a second end connectable to an anti-skid sensing apparatus.

2. A modular landing gear wiring system according to claim 1, wherein said first sub-assembly includes an external abrasion resistant sleeve.

3. A modular landing gear wiring system according to claim 1, wherein said second sub-assembly includes an external abrasion resistant sleeve.

4. A modular landing gear wiring system according to claim 1, wherein said third sub-assembly includes an external abrasion resistant sleeve.

5. A modular landing gear wiring system according to claim 1, wherein said fourth sub-assembly includes an external abrasion resistant sleeve.

6. A modular landing gear wiring system according to claim 1, wherein said connectable ends include composite connectors for reducing overall weight and increasing corrosion resistance.

7. A modular landing gear wiring system for a jet aircraft, said wiring harness comprising:
   a generally tubular wiring harness providing a conduit for electrical wiring, said wiring harness having connectable first, second, third, and fourth sub-assemblies;
   said first sub-assembly having a proximal end adapted for electrical connection to aircraft electrical systems and a distal end adapted with first and second connectors;
   said second sub-assembly having a proximal end connectable to said first sub-assembly distal end first connector, and a distal end connectable to a weight-off-wheels sensing apparatus;
   said third sub-assembly having a proximal end connectable to said first sub-assembly distal end second connector, and a distal end adapted for connection to a brake temperature monitoring apparatus;
   said fourth sub-assembly having a proximal end connectable to said third sub-assembly and a second end connectable to an anti-skid sensing apparatus.

8. A modular landing gear wiring system according to claim 7, wherein said connectors are composite connectors.

9. A modular landing gear wiring system according to claim 7, further including at least one abrasion resistant outer sleeve.

* * * * *

US007135790C1

(12) EX PARTE REEXAMINATION CERTIFICATE (8072nd)
United States Patent
Fondriest (10) Number: US 7,135,790 C1
(45) Certificate Issued: Mar. 8, 2011

(54) MODULAR ELECTRICAL HARNESS FOR JET AIRCRAFT LANDING GEAR SYSTEMS

(76) Inventor: William Fondriest, Deland, FL (US)

Reexamination Request:
No. 90/011,071, Jul. 26, 2010

Reexamination Certificate for:
Patent No.: 7,135,790
Issued: Nov. 14, 2006
Appl. No.: 10/693,801
Filed: Oct. 24, 2003

(51) Int. Cl.
*H01B 7/30* (2006.01)

(52) U.S. Cl. ........................................... 307/147
(58) Field of Classification Search .................. 307/147
See application file for complete search history.

(56) References Cited

PUBLICATIONS

RJ Main Landing Gear Harness Maintenance Manual & Illustrated Parts List; Tempco Document.

*Primary Examiner*—Anjan Deb (57) ABSTRACT

An improved modular landing gear harness for use on a jet aircraft is disclosed. The modular landing gear harness is divided into four sub-assemblies including the main sub-assembly, the brake temperature monitoring sub-assembly, the weight off wheels sub-assembly, and the anti-skid sub-assembly. The various sub-assemblies may be connected to form a unitary harness that provides a protective conduit for wiring for critical landing gear systems. The use of light-weight composite connectors facilitates troubleshooting and substantially reduces the overall weight of the harness assembly.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2-6 and 8-9, dependent on an amended claim, are determined to be patentable.

1. A modular landing gear wiring system for a jet aircraft *having left and right landing gear, each landing gear having inboard and outboard wiring systems*, said wiring system comprising:
   a generally tubular wiring harness providing a conduit for electrical wiring, said wiring harness having connectable first, second, third, and fourth sub-assemblies;
   said first sub-assembly adapted for electrical connection to aircraft electrical systems;
   said second sub-assembly having a first end connectable to said first sub-assembly and a second end connectable to a weight-off-wheels sensing apparatus;
   said third sub-assembly having a first end connectable to said first sub-assembly, a second end adapted for connection to a brake temperature monitoring apparatus;
   and said fourth sub-assembly having a first end connectable to said third sub-assembly and a second end connectable to an anti-skid sensing apparatus;
   *said first sub-assembly including an inboard configuration and an outboard configuration, said inboard and outboard configurations each being interchangeable between left hand and right hand landing gear wiring systems; and*
   *said third sub-assembly being interchangeable between left landing gear inboard and outboard wiring systems and right landing gear inboard and outboard wiring systems.*

7. A modular landing gear wiring system for a jet aircraft *having left and right landing gear, each landing gear having inboard and outboard wiring systems*, said wiring harness comprising:
   a generally tubular wiring harness providing a conduit for electrical wiring, said wiring harness having connectable first, second, third, and fourth sub-assemblies;
   said first sub-assembly having a proximal end adapted for electrical connection to aircraft electrical systems and a distal end adapted with first and second connectors;
   said second sub-assembly having a proximal end connectable to said first sub-assembly distal end first connector, and a distal end connectable to a weight-off-wheels sensing apparatus;
   said third sub-assembly having a proximal end connectable to said first sub-assembly distal end second connector, and a distal end adapted for connection to a brake temperature monitoring apparatus;
   said fourth sub-assembly having a proximal end connectable to said third sub-assembly and a second end connectable to an anti-skid sensing apparatus;
   *said first sub-assembly including an inboard configuration and an outboard configuration, said inboard and outboard configurations each being interchangeable between left hand and right hand landing gear wiring systems; and*
   *said second, third, and fourth sub-assemblies being interchangeable between the left landing gear inboard and outboard wiring systems and right landing gear inboard and outboard wiring systems.*

\* \* \* \* \*